(12) United States Patent
Chang

(10) Patent No.: US 8,461,048 B2
(45) Date of Patent: Jun. 11, 2013

(54) FABRICATION METHOD OF MINUTE PATTERN

(75) Inventor: Hsi-Ming Chang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 210 days.

(21) Appl. No.: 13/034,651

(22) Filed: Feb. 24, 2011

(65) Prior Publication Data

US 2012/0138569 A1     Jun. 7, 2012

(30) Foreign Application Priority Data

Dec. 2, 2010   (TW) ............................... 99141956 A

(51) Int. Cl.
     *H01L 21/311*      (2006.01)

(52) U.S. Cl.
     USPC ............ 438/694; 438/696; 438/703; 438/745

(58) Field of Classification Search
     None
     See application file for complete search history.

(56) References Cited

U.S. PATENT DOCUMENTS

| 6,678,027 | B2 | 1/2004 | Park et al. | |
| 8,247,164 | B2 * | 8/2012 | Otsuka | 430/312 |
| 2010/0105196 | A1 * | 4/2010 | Cheng et al. | 438/487 |

FOREIGN PATENT DOCUMENTS

JP      404077719 A   *   3/1992

* cited by examiner

*Primary Examiner* — Duy Deo
(74) *Attorney, Agent, or Firm* — Jianq Chyun IP Office

(57) ABSTRACT

A fabrication method of a minute pattern at least includes following steps. A first crystallizable material layer is formed on a base material. The first crystallizable material layer is patterned to form a plurality of first patterns on the base material. A distance between every two adjacent first patterns is greater than a width of each of the first patterns. A first treatment process is performed to crystallize the first patterns. A second crystallizable material layer is formed on the base material and covers the first patterns. The second crystallizable material layer is patterned to form a plurality of second patterns on the base material. Each of the second patterns is located between the first patterns adjacent thereto, respectively.

9 Claims, 7 Drawing Sheets

FABRICATION METHOD OF MINUTE PATTERN

CROSS-REFERENCE TO RELATED APPLICATION

This application claims the priority benefit of Taiwan application serial no. 99141956, filed on Dec. 2, 2010. The entirety of the above-mentioned patent application is hereby incorporated by reference herein and made a part of this specification.

BACKGROUND OF THE INVENTION

1. Field of the Invention

The invention relates to a fabrication method. More particularly, the invention relates to a fabrication method of a minute pattern.

2. Description of Related Art

FIG. 1 is a partial cross-sectional view illustrating a liquid crystal display (LCD) panel. With reference to FIG. 1, the LCD panel 100 is a fringe field switching (FFS) LCD panel, for instance, and the LCD panel 100 at least includes a substrate 110, a lower transparent conductive layer 120, an insulating layer 130, and an upper transparent conductive layer 140. The lower transparent conductive layer 120 is configured on the substrate 110. The insulating layer 130 covers the lower transparent conductive layer 120. The upper transparent conductive layer 140 is configured on the insulating layer 130.

As shown in FIG. 1, if the line width W and the pitch S of the upper transparent conductive layer 140 are minute, the transmittance rate can be relatively high in most cases, and thereby the LCD panel 100 can display images with favorable quality. However, the pitch S that can be achieved by the exposure machine which is currently used in the panel industry is about 3 µm in most cases. When the positive photoresist is applied, for instance, the pitch S of the upper transparent conductive layer 140 can at most reach 3 µm at this current stage. That is to say, it is unlikely to form the upper transparent conductive layer 140 with the line width W and the pitch S that are both less than about 3 µm.

SUMMARY OF THE INVENTION

The invention is directed to a fabrication method by which patterns with the minute line width and the minute pitch can be formed.

The invention provides a fabrication method of a minute pattern. The fabrication method includes at least following steps. A first crystallizable material layer is formed on a base material. The first crystallizable material layer is patterned to form a plurality of first patterns on the base material. A distance between every two adjacent first patterns is greater than a width of each of the first patterns. A first treatment process is performed to crystallize the first patterns. A second crystallizable material layer is formed on the base material and covers the first patterns. The second crystallizable material layer is patterned to form a plurality of second patterns on the base material. Each of the second patterns is located between the first patterns adjacent thereto, respectively.

According to an embodiment of the invention, a distance between each of the second patterns and each of the first patterns adjacent thereto is the same. According to an embodiment of the invention, a distance between each of the second patterns and each of the first patterns adjacent thereto is equal to a width of each of the second patterns.

According to an embodiment of the invention, the base material includes a substrate or an insulating layer.

According to an embodiment of the invention, the first crystallizable material layer and the second crystallizable material layer are amorphous transparent conductive materials, respectively.

According to an embodiment of the invention, the first patterns are made of a polycrystalline transparent conductive material after the first treatment process is performed on the first patterns.

According to an embodiment of the invention, the fabrication method further includes performing a second treatment process on the second patterns to crystallize the second patterns. According to an embodiment of the invention, the second patterns are made of a polycrystalline transparent conductive material after the second treatment process is performed on the second patterns.

According to an embodiment of the invention, a method of patterning the first crystallizable material layer to form the first patterns includes following steps. A patterned photoresist layer is formed on the first crystallizable material layer. Here, the patterned photoresist layer has a plurality of openings, and the openings expose a portion of the first crystallizable material layer. The exposed portion of the first crystallizable material layer (i.e., the portion which is not covered by the patterned photoresist layer) is removed with use of the patterned photoresist layer as a mask, so as to form the first patterns.

According to an embodiment of the invention, a method of removing the exposed portion of the first crystallizable material layer includes wet etching.

According to an embodiment of the invention, a method of patterning the second crystallizable material layer to form the second patterns includes following steps. A patterned photoresist layer is formed on the second crystallizable material layer. Here, the patterned photoresist layer has a plurality of openings, and the openings expose a portion of the second crystallizable material layer. The exposed portion of the second crystallizable material layer (i.e., the portion which is not covered by the patterned photoresist layer) is removed with use of the patterned photoresist layer as a mask, so as to form each of the second patterns respectively between the first patterns adjacent thereto.

According to an embodiment of the invention, a method of removing the exposed portion of the second crystallizable material layer includes wet etching.

According to an embodiment of the invention, the material of the first crystallizable material layer and the material of the second crystallizable material layer respectively include at least one of indium tin oxide (ITO), indium zinc oxide (IZO), indium tin zinc oxide (ITZO), zinc oxide (ZnO), aluminum tin oxide (ATO), aluminum zinc oxide (AZO), cadmium tin oxide (CTO), and cadmium zinc oxide (CZO).

According to an embodiment of the invention, the distance between every two adjacent first patterns is substantially 3 µm, and the distance between each of the second patterns and each of the first patterns adjacent thereto is substantially 1 µm.

In light of the foregoing, at least one of the following effects can be accomplished according to the embodiments of the invention. The first patterns and the second patterns are sequentially formed on the substrate, and each of the second patterns is formed between the first patterns adjacent thereto. Besides, the distance between every two adjacent first patterns is greater than the width of each of the first patterns and the width of each of the second patterns, respectively. Thereby, notwithstanding the limited exposure conditions, the patterns with the minute line width and the minute pitch can still be formed. On the other hand, the first patterns are crystallized after the thermal treatment process is performed thereon. Hence, when the second crystallizable material layer is patterned, the first patterns are not affected and thus are not etched, which simplifies the fabrication method of the invention.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 2A to FIG. 7A are top views illustrating a fabrication method suitable for forming a minute pattern according to an embodiment of the invention.

FIG. 2B to FIG. 7B are cross-sectional views illustrating the fabrication method depicted in FIG. 2A to FIG. 7A.

DESCRIPTION OF EMBODIMENTS

In general, when a photolithography and etching process is performed with use of an exposure machine, patterns formed thereby may have the line width and the pitch that are subject to the design of the machine or the optical limitations caused by the exposure conditions. Accordingly, it is rather difficult to form the minute patterns, as disclosed in the related art. To resolve said issue, an embodiment of the invention is directed to a fabrication method of a pattern with the minute line width and the minute pitch when the same exposure machine is applied and the exposure conditions are the same as those disclosed in the related art. In the following descriptions of this embodiment, a plurality of transparent conductive patterns are exemplarily formed.

Figure 1:
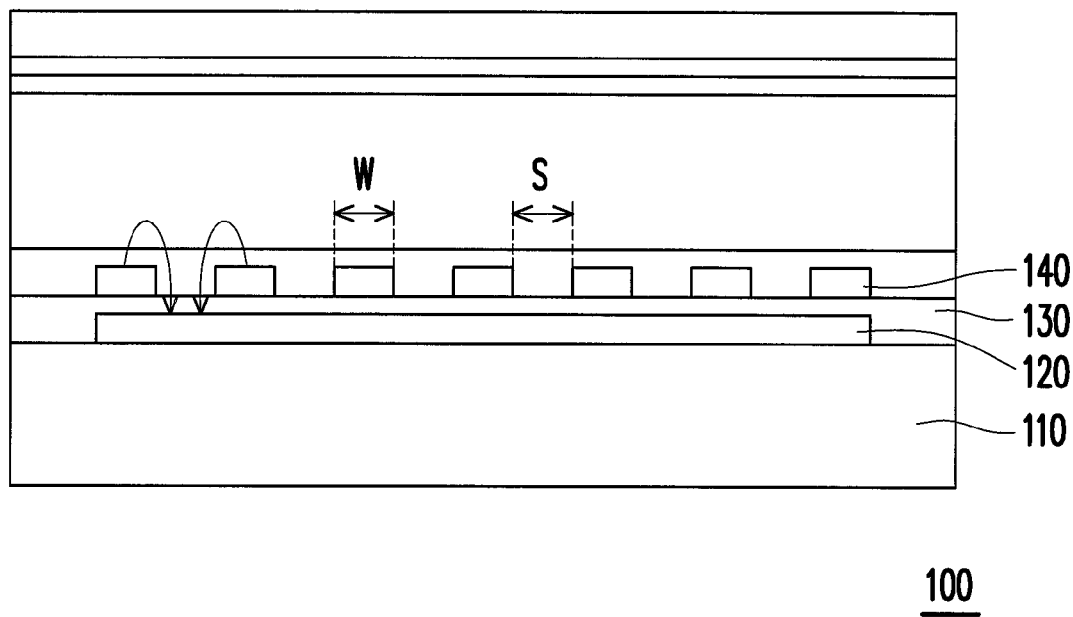
FIG. 1 is a partial cross-sectional view illustrating an LCD panel.
Figure 2A:
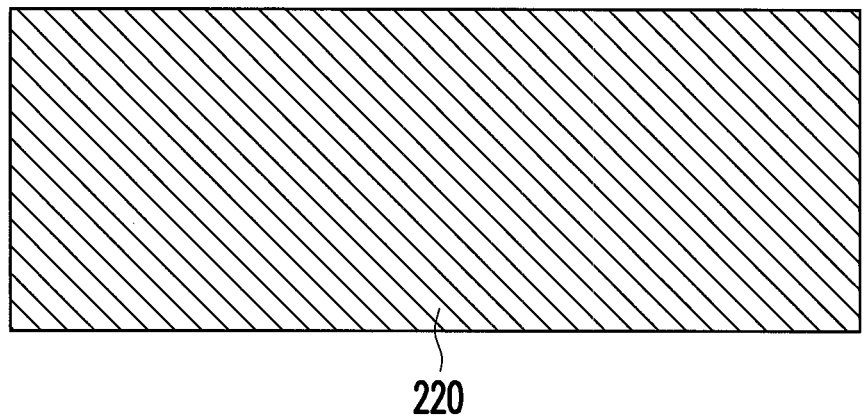
Figure 2B:
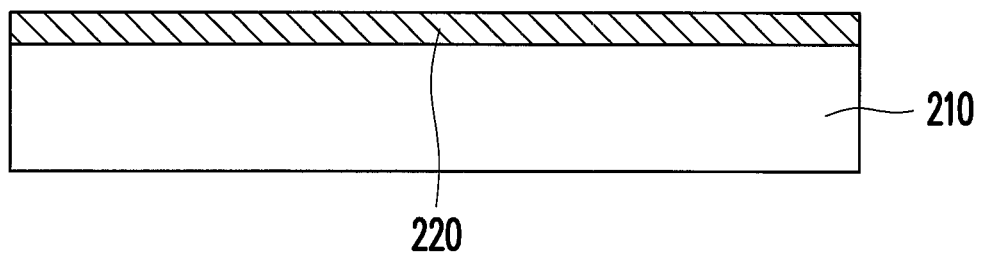

FIG. 2A to FIG. 7A are top views illustrating a fabrication method suitable for forming a minute pattern according to an embodiment of the invention. FIG. 2B to FIG. 7B are cross-sectional views illustrating the fabrication method depicted in FIG. 2A to FIG. 7A. With reference to FIG. 2A and FIG. 2B, a first crystallizable material layer 220 is formed on a base material 210. The base material 210 of this embodiment can be a normal glass substrate or an insulating layer. In an FFS LCD panel or an in-plane switching (IPS) LCD panel, for example, if a plurality of the bar-shaped crystallizable material layers located on the insulating layer can have the minute line width and the minute pitch, the minute patterns can be conducive to image display. Hence, the base material 210 of this embodiment can generally refer to the normal substrate or specifically refer to an insulating layer or any other passivation layer.

Besides, the first crystallizable material layer 220 of this embodiment is made of an amorphous transparent conductive material, for instance. The material of the first crystallizable material layer 220 can be ITO, IZO, ITZO, ZnO, ATO, AZO, CTO, or CZO.

Figure 3A:
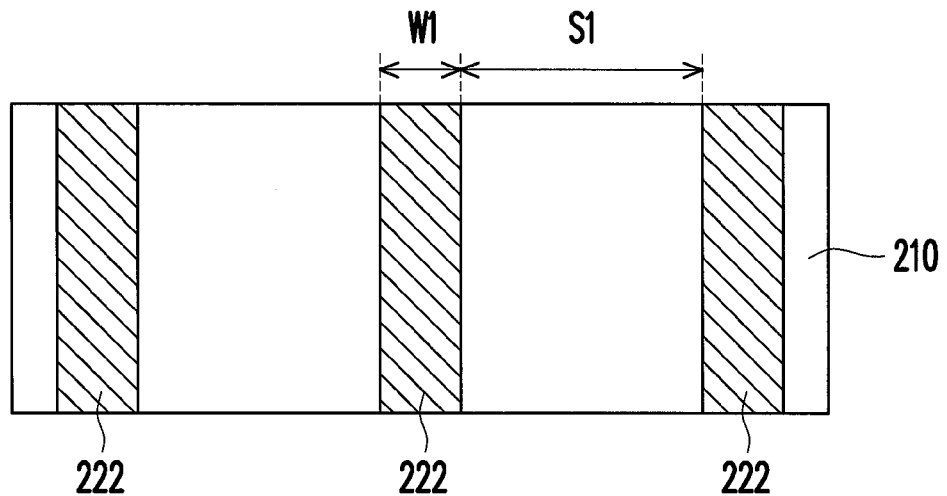
Figure 3B:
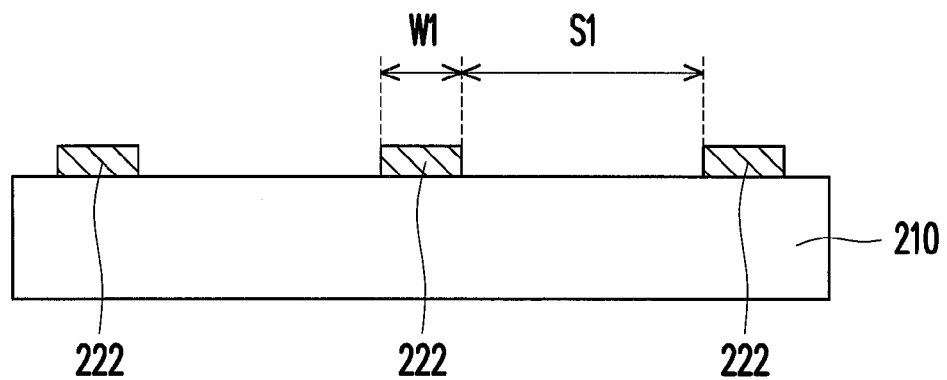

The first crystallizable material layer 220 is patterned to form a plurality of first patterns 222 on the base material 210. A distance S1 between every two adjacent first patterns 222 is greater than a width W1 of each of the first patterns 222, as indicated in FIG. 3A and FIG. 3B. In this embodiment, a method of patterning the first crystallizable material layer 220 to form the first patterns 222 is, for example, a conventional photolithography and etching process. For instance, a patterned photoresist layer (not shown) is formed on the first crystallizable material layer 220. Here, the patterned photoresist layer has a plurality of openings, and the openings expose a portion of the first crystallizable material layer 220. The exposed portion of the first crystallizable material layer 220 (i.e., the portion of the first crystallizable material layer 220 which is not covered by the patterned photoresist layer) can be removed by performing a wet etching process with use of the patterned photoresist layer as a mask, so as to form the first patterns 222 on the base material 210, as indicated in FIG. 3A and FIG. 3B.

The first crystallizable material layer 220 is etched with use of a weak-acid etchant (e.g., oxalic acid) by performing the wet etching process according to this embodiment, for instance. Besides, the patterned photoresist layer of this embodiment is positive photoresist, for instance. The positive photoresist can be removed by the developer after the positive photoresist absorbs light. Namely, the distance S1 between every two of the first patterns 222 is the minimum pitch that can be achieved by the conventional exposure machine after the photolithography process is performed. In this embodiment, the distance S1 between every two adjacent first patterns 222 is substantially an integral multiple of the width W1 of each of the first patterns 222. Here, the distance S1 is the triple of the width W1, which should however not be construed as a limitation to the invention.

Figure 4A:
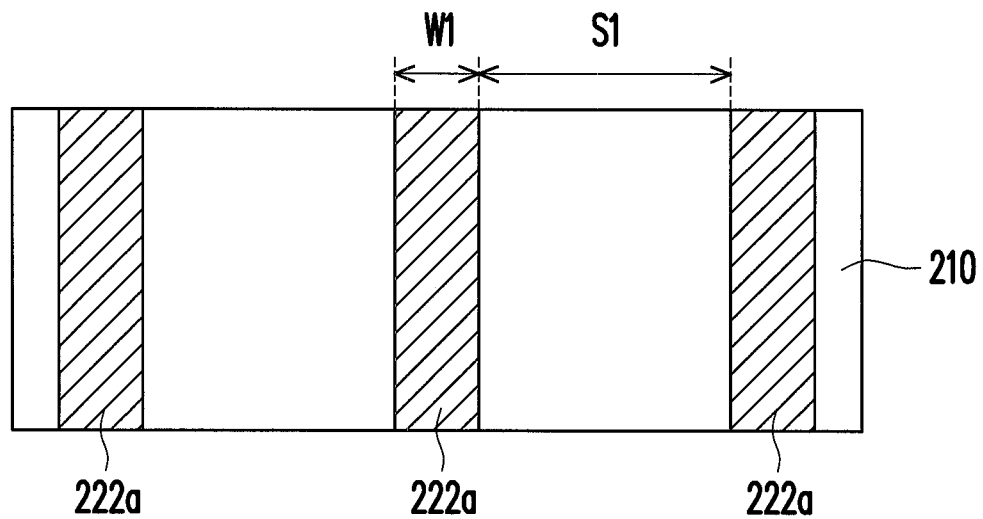
Figure 4B:
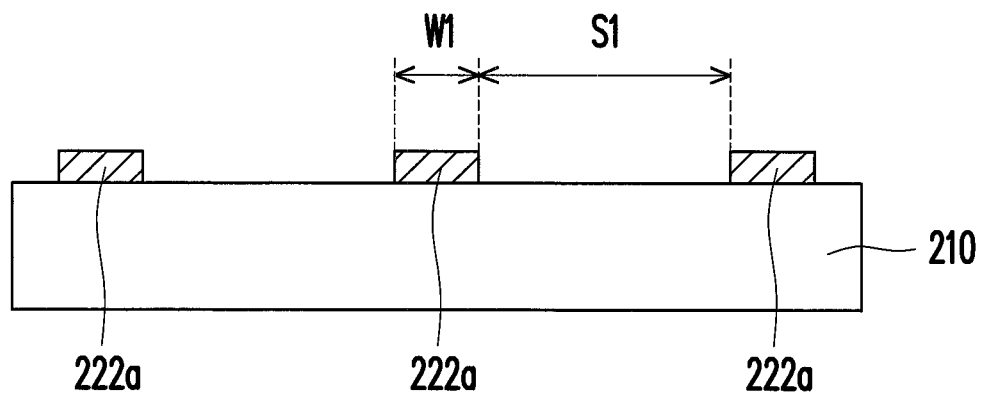

A first treatment process is performed on the first patterns 222, such that the first patterns 222 are crystallized to form the poly first patterns 222a, as indicated in FIG. 4A and FIG. 4B. In this embodiment, the first treatment process is a conventional thermal annealing process, for instance. To be more specific, the first crystallizable material layer 220 is made of the amorphous transparent conductive material, and thus the patterned first patterns 222 are also made of the amorphous transparent conductive material. To improve conductivity and light transmittance of the first patterns 222, the first patterns 222 can be crystallized by performing the thermal annealing process, so as to form the poly first patterns 222a, as shown in FIG. 4A and FIG. 4B.

Figure 5A:
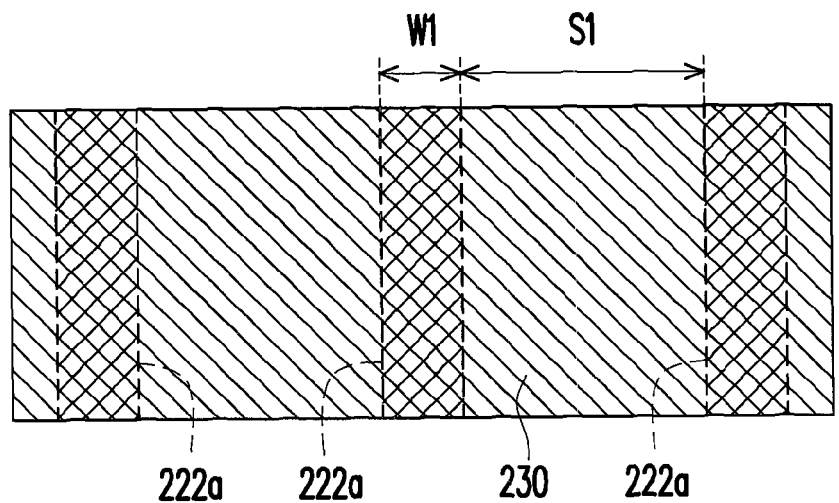
Figure 5B:
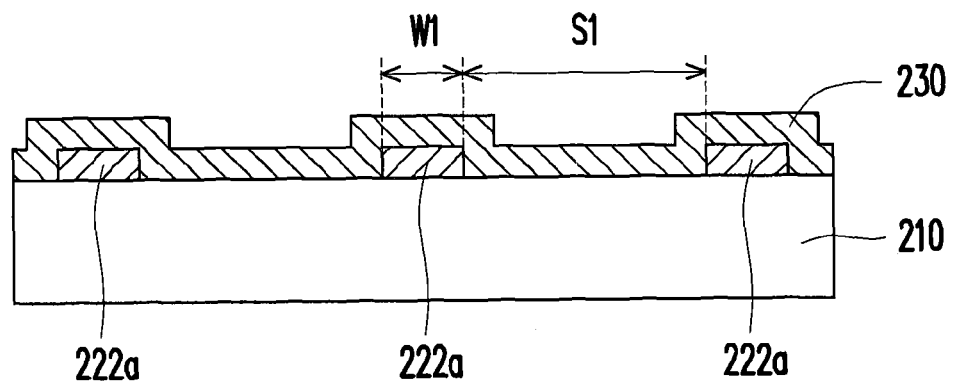

A second crystallizable material layer 230 is formed on the base material 210 and covers the first patterns 222a, as indicated in FIG. 5A and FIG. 5B. In this embodiment, the second crystallizable material layer 230 and the first crystallizable material layer 220 can be made of the same material or different materials. Besides, the second crystallizable material layer 230 can be made of the above-mentioned materials of the first crystallizable material layer 220, and thus no other descriptions are given herein.

Figure 6A:
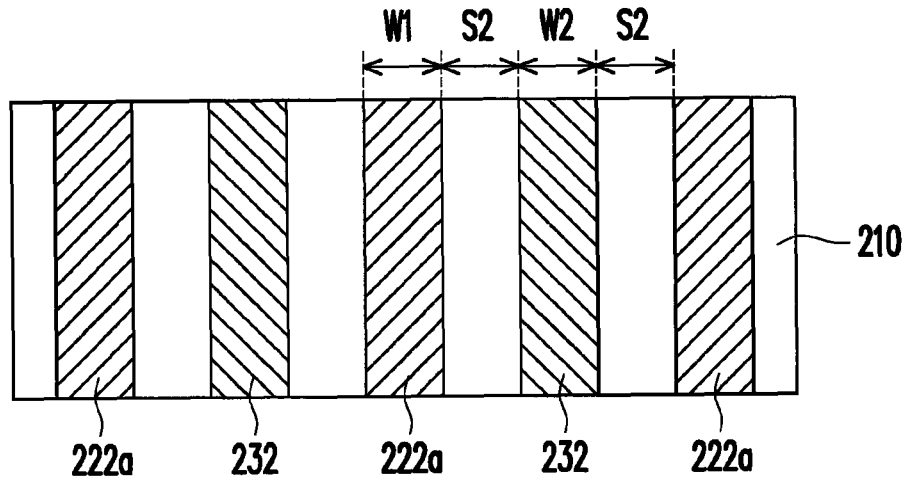
Figure 6B:
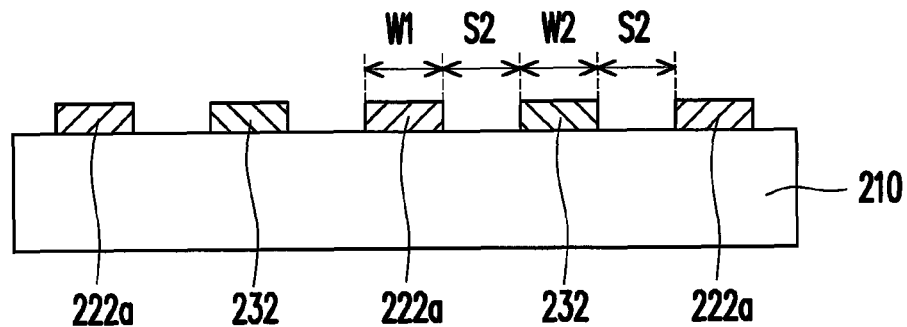

The second crystallizable material layer 230 is patterned to form a plurality of second patterns 232 on the base material 210. Each of the second patterns 232 is located between the first patterns 222a adjacent thereto, respectively, as shown in FIG. 6A and FIG. 6B. In this embodiment, the second crystallizable material layer 230 is patterned by applying the method of patterning the first crystallizable material layer 220 described above, and therefore relevant descriptions are omitted herein. Note that the first patterns 222a are made of the polycrystalline transparent conductive material, and the first patterns 222a are not etched by the etchant and thus are not removed when the exposed portion of the second crystallizable material layer 230 which is not covered by the patterned photoresist layer is removed.

The distance S2 between each of the second patterns 232 and each of the first patterns 222a adjacent thereto can be the same, and the distance S2 can be the same as the width W2 of each of the second patterns 232, as indicated in FIG. 6A and FIG. 6B. To be more specific, if the distance S1 between every two of the first patterns 222a is the triple of the width W1 of each of the first patterns 222a, and the distance S2 between each of the second patterns 232a and each of the first patterns 222a adjacent thereto is the same as the width W2 of each of the second patterns 232, each of the second patterns 232 is located between the first patterns 222a adjacent thereto, and the first patterns 222a and the second patterns 232 are equidistantly arranged.

For example, if the distance S1 that is between every two of the first patterns 222a and can be achieved by the exposure machine when photolithgraphy process is performed can reach 3 μm at most, as shown in FIG. 3A and FIG. 3B, the patterns 222a and 232 having the distance S2 of about 1 μm therebetween can be formed by applying the fabrication method described in this embodiment. Here, photolithgraphy process is performed when positive photoresist is exemplarily applied, which should however not be construed as a limitation to the invention. Namely, notwithstanding the limited exposure conditions of the exposure machine, the minute patterns can still be formed by applying the fabrication method of this embodiment.

Figure 7A:
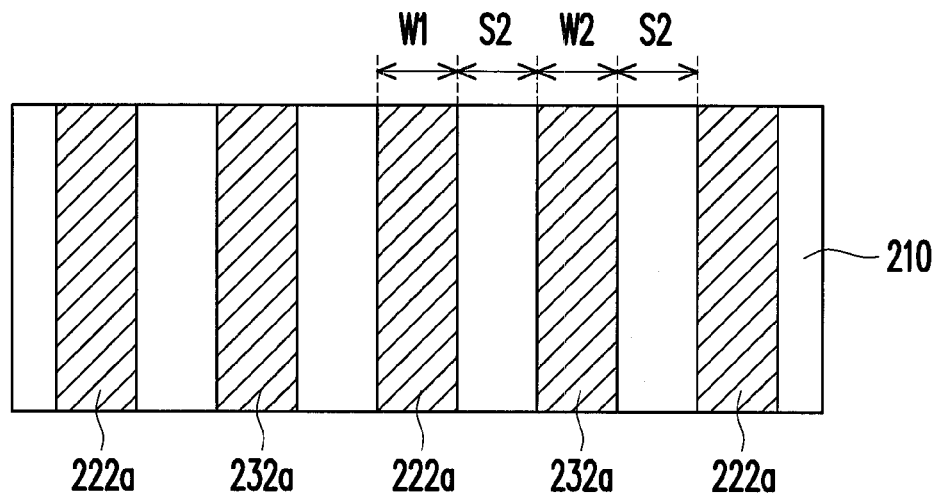
Figure 7B:
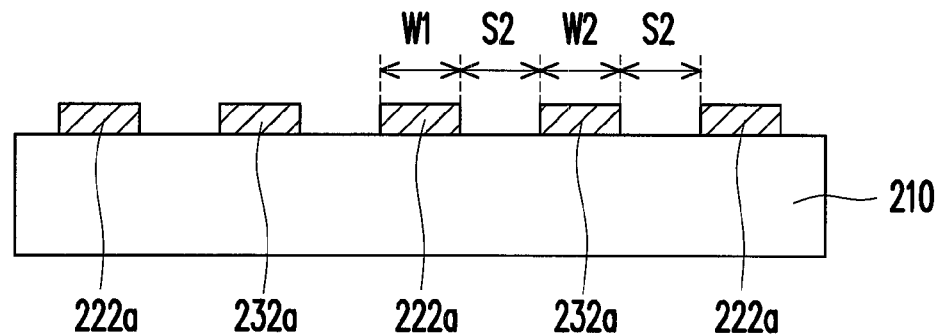

Meanwhile, to improve conductivity and light transmittance of the second patterns 232, the fabrication method further includes performing a second treatment process on the second patterns 232, so as to crystallize the second patterns 232 and form the poly second patterns 232a shown in FIG. 7A and FIG. 7B. In this embodiment, the second treatment process, for example, is the same as the first treatment process, and therefore no further description is given herein. So far, the fabrication method of the minute patterns is substantially conducted. By applying the fabrication method, the minute patterns can be effectively formed, and favorable display performance can be achieved by the minute patterns.

In light of the foregoing, at least one of the following effects can be accomplished according to the embodiments of the invention. The first patterns and the second patterns are sequentially formed on the substrate, and each of the second patterns is formed between the first patterns adjacent thereto. Besides, the distance between every two adjacent first patterns is greater than the width of each of the first patterns and the width of each of the second patterns, respectively. Thereby, notwithstanding the limited exposure conditions, the patterns with the minute line width and the minute pitch can still be formed. On the other hand, the first patterns are crystallized after the thermal treatment process is performed thereon. Hence, when the second crystallizable material layer is patterned, the first patterns are not affected and thus are not etched, which simplifies the fabrication method of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions. Any of the embodiments or any of the claims of the invention does not need to achieve all of the advantages or features disclosed by the invention. Moreover, the abstract and the headings are merely used to aid in searches of patent files and are not intended to limit the scope of the claims of the invention.

What is claimed is:

1. A fabrication method of a minute pattern, comprising:
   forming a first crystallizable material layer on a substrate;
   forming a patterned photoresist layer on the first crystallizable material layer, the patterned photoresist layer having a plurality of openings, the openings exposing a portion of the first crystallizable material layer;
   removing the exposed portion of the first crystallizable material layer with use of the patterned photoresist layer as a mask, so as to form a plurality of first patterns on the substrate, wherein a distance between every two adjacent first patterns of the first patterns is greater than a width of each of the first patterns;
   performing a first treatment process on the first patterns to crystallize the first patterns;
   forming a second crystallizable material layer on the substrate, the second crystallizable material layer covering the first patterns; and
   patterning the second crystallizable material layer to form a plurality of second patterns on the substrate, wherein each of the second patterns is respectively located between the first patterns adjacent thereto.

2. The fabrication method as claimed in claim 1, wherein the first crystallizable material layer and the second crystallizable material layer are amorphous transparent conductive materials, respectively.

3. The fabrication method as claimed in claim 1, wherein the first patterns are made of a polycrystalline transparent conductive material after the first treatment process is performed on the first patterns.

4. The fabrication method as claimed in claim 1, further comprising performing a second treatment process on the second patterns to crystallize the second patterns.

5. The fabrication method as claimed in claim 4, wherein the second patterns are made of a polycrystalline transparent conductive material after the second treatment process is performed on the second patterns.

6. The fabrication method as claimed in claim 1, wherein a method of removing the exposed portion of the first crystallizable material layer is wet etching.

7. The fabrication method as claimed in claim 1, wherein a method of patterning the second crystallizable material layer to form the second patterns comprises:
   forming a patterned photoresist layer on the second crystallizable material layer, the patterned photoresist layer having a plurality of openings, the openings exposing a portion of the second crystallizable material layer; and
   removing the exposed portion of the second crystallizable material layer with use of the patterned photoresist layer as a mask, so as to form each of the second patterns respectively between the first patterns adjacent thereto.

8. The fabrication method as claimed in claim 7, wherein a method of removing the exposed portion of the second crystallizable material layer is wet etching.

9. The fabrication method as claimed in claim 1, wherein the distance between every two adjacent first patterns of the first patterns is substantially 3 μm, and a distance between each of the second patterns and each of the first patterns adjacent thereto is substantially 1 μm.

\* \* \* \* \*